Patented Mar. 13, 1934

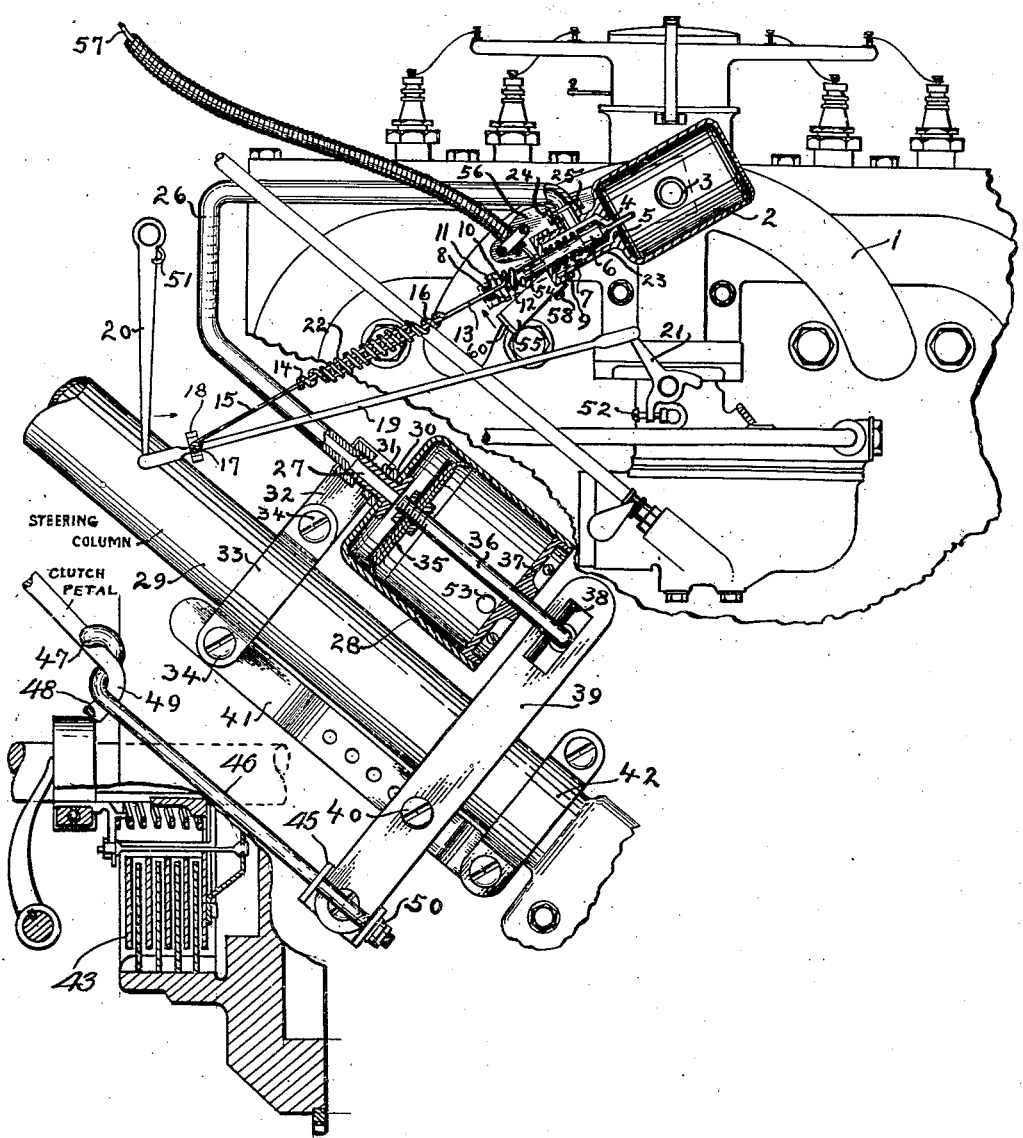

1,950,656

UNITED STATES PATENT OFFICE 1,950,656

FREEWHEELING DEVICE

Carl C. Bradley and Lynn E. Thatcher, Tampa, Fla.

Application June 9, 1931, Serial No. 543,076

6 Claims. (Cl. 192—.01)

This invention relates to devices adapted to release the driving connection between the motor and the drive wheels of a motor vehicle to permit coasting whenever the accelerator control is allowed to reach the idling position.

The primary object of the invention is to provide an accessory for the purpose stated which can be attached to the controlling means already in use in cars equipped with vacuum operated windshield wipers, without the necessity of drilling any holes or making any alterations in parts.

A further object of the invention comprises the provision of means for rendering the automatic clutch release inoperative at will, while permitting the free use of the normal control mechanisms.

Other objects will appear in connection with the description of a preferred embodiment of the invention illustrated in the accompanying drawing. It will be evident that the invention does not consist in the specific details of construction shown, but that many alterations and rearrangements may be made without departing from the fundamental principles of the invention as claimed. It will also be evident that the drawing is more or less diagrammatic, many parts being omitted, and parts being broken away.

The figure in the drawing represents a side elevation of a well-known make of automobile motor broken away at the front and below to show the steering column, the accessory device embodying the present invention being shown as mounted upon the intake manifold and upon the steering column and connected to the clutch pedal.

In cars having a windshield wiper operated by the suction derived from the intake manifold 1, a hole is already provided at the mid-point of the manifold into which is screwed the connection for the tubing leading to the wiper mechanism.

In cars not so equipped, a hole of the standard size will be drilled and threaded as if to receive a tube connection.

With this connection removed, a vacuum chamber 2 will be secured upon the manifold, as by a threaded nipple 3, or by other suitable means. At one end, this chamber is provided with an opening 4 surrounded by a beveled seat 5 which is engaged by the tapering end of a valve 6 normally held in place by a spring 7 which surrounds the valve stem 8. A removable cap 9 fits the stem closely to prevent the passage of air while allowing the stem to slide freely. The outer end of the stem is threaded for the longitudinal adjustment of a nut 10 held in adjusted position by a lock nut 11.

Surrounding the stem, is the coiled end 12 of a wire 13 which may slide upon the stem between the cap 9 and the nut 10. The other end of the wire 13 is coiled at 14 for sliding movement on a wire 15 which has its free end 16 coiled around the wire 13, and its other end secured around a set screw 17 which holds a sleeve 18 on the rod 19 leading from the accelerator shaft lever 20 to the carburetor throttle shaft crank 21. A spring 22 surrounds the wires 13 and 15 between the coiled ends 14 and 16.

The valve chamber 23 which holds the valve 6 and the spring 7 has a port 24 provided with a cap 25 to hold a tube 26 which passes back of the engine and leads to a port 27 in the end of a cylinder 28 mounted upon the steering column 29.

As shown, the port 27 may be formed as a flanged tube passing through the end of the cylinder and through a bracket member 30 to which it is held by a nut 31. The bracket member 30 is mounted on the outer end of a clamp arm 32 held upon the steering column by a strap 33 and bolts 34.

Within the cylinder is a piston 35 having a piston rod 36 preferably guided for axial movement by a plate 37 in the outer end of the cylinder. The end of the rod 36 is formed to engage a flanged sidewall of a slot 38 in a lever 39 pivoted at 40 on a strap 41 suitably offset to bring the lever to one side of the steering column. One end of the strap 41 may be secured to the arm 32 and strap 33 by one of the bolts 34, and the other end may be attached to the column 29 by a clamp 42.

The lower end of the lever 39 is connected to the clutch pedal by a linkage which in the form illustrated comprises a U-shaped bracket 45 pivoted near the end of the lever and having its free arms perforated to receive one end of a rod 46 which has its other end formed into a spiral hook 47 adapted to be engaged around the clutch pedal 48 near its front corner 49 before the front end of the rod is slid through the bracket 45 and secured in adjusted position by the nuts 50. The hooked end 47 can slide on the pedal and the rod 46 can slide through the bracket, thus permitting the clutch pedal to be operated by the foot without moving the lever 39 when it is in inoperative position. The linkage shown is substantially as free as a chain with certain advantages thereover.

The parts are shown in the position they assume when the accelerator pedal is released to allow the motor to slow down.

The eccelerator shaft lever 20 is actuated by a strong spring of which the end is indicated at 51, to assume a substantially vertical position holding the rod 19 under tension and swinging the carburetor throttle shaft crank 21 to a point limited by the adjustment of the throttle lever stop screw 52.

This movement of the lever 20 pulls the sleeve 18 toward the rear, carrying with it the end of the wire 15, thus causing the spring 22 to become compressed. As the lever 20 nears the limit of its inward movement, the compression of the spring 22 becomes great enough to overcome the resistance of the spring 7, and the valve 6 is lifted out of its seat 5. The chamber 2 communicating with the intake manifold 1 is under partial vacuum, so that the air in the valve chamber 23 and in the tube 26 is withdrawn causing a partial vacuum in the cylinder 28 which permits the piston 35 to move under the pressure upon its outer surface. A port 53 is indicated in the side wall of the cylinder as an inlet for air, and atmospheric pressure is ordinarily sufficient to furnish the desired movement of the piston.

Inward movement of the piston will swing the lever 39 on its pivot and through the link rod 46 will exert a pull upon the clutch pedal lever sufficient to release the clutch. The simple act of releasing the accelerator pedal will thus automatically result in throwing out the clutch to give "free wheeling", the driving connection between the engine and the drive wheels of the motor vehicle being opened.

It will be observed that the "free wheeling" occurs just at the times when the driver instinctively or purposely acts to cut down on the fuel supply, which is at situations where the driving force of the engine is not needed.

Pressure on the accelerator pedal will swing the lever 20 in the direction indicated by the arrow; the spring 22 will expand; the spring 7 will close the valve 6; and as the valve stem slides through the cap 9, a slot 54 in the stem acts as a relief valve to admit air into the valve chamber 23 and thence into the pipe 26, allowing the piston to move outward under the pull exerted upon the lever 39 by the spring which actuates the clutch pedal, and the pedal returning at the retarded rate due to the small slot 54 allows the clutch to engage smoothly and without shock.

As a means for preventing the operation of the valve 6, a latch 55 may be pivoted upon a bracket 56, a wire 57 being secured to the latch at 58 and passing through a spiral conduit to any point within easy reach of the driver. The wire will swing the latch in the direction indicated by the arrow near it, to the broken line position in which a flange 60 lies against the end of the valve stem to prevent the valve from being lifted from its seat. When the accelerator is released, the spring 22 will be compressed a little more than it is when the spring 7 can yield, but the valve 6 will remain inoperative.

Those familiar with the art will perceive that many changes in details of the elements shown may be made and many different arrangements of parts, within the range of equivalents of what is claimed.

We claim:

1. In a motor vehicle, an internal combustion engine having an intake manifold, a throttle, and a control means for the throttle, a suction tube communicating with the manifold, a valve for the tube, a spring to hold the valve closed, an operating means for the valve comprising two relatively movable parts having a spring interposed between them and one of the parts being connected to the throttle control means, the arrangement being such that movement of the throttle control means to close the throttle will actuate the valve for the tube only as the throttle control means nears the limit of its movement.

2. A structure as in claim 1 having a manually operated means to hold the valve from opening.

3. A structure as in claim 1 having means for adjusting the tension of the spring upon the relatively movable parts of the operating means for the valve.

4. In an automobile, an internal combustion engine having an intake manifold and a throttle, a clutch, a control pedal for the clutch, a cylinder and a piston adapted to operate the pedal, a conduit between the intake manifold of the engine and the cylinder, a valve for the conduit, a control means for the throttle, and means actuated by the control means for the throttle to open the valve for the conduit when the control means closes the throttle, said means for opening the valve comprising two relatively movable parts having a spring interposed between them and one of the parts being connected to the throttle control means, the arrangement being such that movement of the throttle control means to close the throttle will actuate the valve for the conduit only as the throttle control means nears the limit of its movement.

5. A structure as in claim 4 having manually operated means for preventing the operation of the piston.

6. In an automobile having an internal combustion engine, a clutch, an unclutching pedal controlling the clutch through the usual means, a carbureter, a throttle, a throttle control rod, and a steering column, an accessory unclutching mechanism wherein the power required to overcome the resistance of the clutch springs is supplied by the vacuum produced by the suction of the engine in the intake manifold between the engine and the carbureter comprising a cylinder having means adapting it for mounting on the steering column, a piston and a piston rod movable in the cylinder, a linkage adapted for connection with the pedal, a conduit connected with the cylinder and adapted for connection with the intake manifold of the engine, a valve for closing the connection with the manifold, an operating means for the valve adapted for connection with the throttle control rod and adjustable to actuate the valve only as the throttle control rod nears the limit of its movement, the said operating means for the valve being provided with a yielding portion permitting operation of the throttle control rod when the valve is prevented from moving, and a manually operated means for holding the valve closed.

CARL C. BRADLEY.
LYNN E. THATCHER.